(12) United States Patent
Loreggia et al.

(10) Patent No.: US 8,511,591 B1
(45) Date of Patent: Aug. 20, 2013

(54) SYSTEM AND METHOD FOR SEPARATING AND RECYCLING MULTI-LAYERED CONSTRUCTION PANELS

(75) Inventors: Diego Loreggia, Padua (IT); Fabrizio Donnola, Venice (IT)

(73) Assignee: SDF Recycling, LLC., Miami, FL (US)

( * ) Notice: Subject to any disclaimer, the term of this patent is extended or adjusted under 35 U.S.C. 154(b) by 0 days.

(21) Appl. No.: 13/362,388

(22) Filed: Jan. 31, 2012

(51) Int. Cl.
*B02C 19/00* (2006.01)
*B02C 15/00* (2006.01)
*B02C 25/00* (2006.01)

(52) U.S. Cl.
USPC ............. 241/25; 241/29; 241/152.2; 241/159

(58) Field of Classification Search
USPC ............... 241/29, 25, 101.2, 152.2, 158, 159, 241/186.35
See application file for complete search history.

(56) References Cited

U.S. PATENT DOCUMENTS 5,785,259 A * 7/1998 Nishibori .................... 241/24.18
5,871,161 A * 2/1999 Nishibori ........................ 241/19

\* cited by examiner

*Primary Examiner* — Faye Francis
(74) *Attorney, Agent, or Firm* — Malloy & Malloy, P.L.

(57) ABSTRACT

A system and method for extracting an inner layer (e.g., an inner gypsum layer) from a multi-layered construction panel (e.g., gypsum board, plaster board, drywall, etc.) and utilizing the extracted layer to construct a recycled construction panel is presented. In particular, the present invention comprises an extraction assembly structured to cut or otherwise remove the outer, paper layers from the construction panel, leaving the inner, gypsum layer. The inner layer is then fed into a crashing assembly structured to break the layer into a plurality of pieces. The plurality of pieces are transported or fed into a milling assembly where a smaller or powdery substance is obtained. From that substance, a new construction panel (or inner, gypsum layer) can be constructed.

18 Claims, 6 Drawing Sheets

SYSTEM AND METHOD FOR SEPARATING AND RECYCLING MULTI-LAYERED CONSTRUCTION PANELS

BACKGROUND OF THE INVENTION

1. Field of the Invention

The present invention is generally directed to a system and method for separating and recycling at least one layer of a multi-layered construction panel. Specifically, in at least one embodiment of the present invention, the inner or gypsum layer of a gypsum panel (or drywall board) is extracted or separated by removing the outer, paper layers there from. Once extracted, the inner gypsum layer is processed by a crashing and/or milling technique in a manner such that it can be used to construct another or subsequent multi-layered construction panel, and in particular, the inner gypsum layer thereof.

2. Description of the Related Art

Gypsum board, drywall, plasterboard, or wallboard is a multi-layered construction panel that generally includes an inner layer substantially or primarily made of gypsum plaster, wood pulp, or other material which is commonly pressed or disposed between two outer layers, typically made of paper or a paper product. Once created, the gypsum board or drywall is commonly used to construct or otherwise form the interior walls of a home, office of other building.

Specifically, raw gypsum that is mined or otherwise obtained is chemically treated, calcined or impregnated with certain additives in order to create the gypsum powder or gypsum plaster that is ultimately used to construct the final gypsum board. Once the gypsum plaster is created, a core or layer of the gypsum plaster is sandwiched between two sheets of heavy paper or fiberglass layers. The final dried product is a generally rigid and sturdy multi-layered construction panel that can be used to assist with the construction of the interior walls of a building, as mentioned above.

Disposal of unused or previously used gypsum board or drywall has become a serious environmental and perhaps financial problem, and in fact, some landfills and dump sites have banned the disposal of drywall all together. Accordingly, when a contractor, builder, construction company, or homeowner needs to dispose of a gypsum board or drywall panel, and the landfills will not accept the materials, it is not uncommon for the individual or company to bury the gypsum board panels or materials in a non-designated dumping ground. This unauthorized and non-designated dumping of the gypsum board can create serious concerns and/or hazards for the proximate environment.

Accordingly, there is a current need in the art for a system and method for recycling the gypsum board or at least a portion thereof. In particular, there is a need for an extraction and recycling system and method that is structured to separate or extract the inner gypsum plaster layer of the gypsum board and process the materials in a manner in which it can be reused to create another subsequent gypsum board.

SUMMARY OF THE INVENTION

As will be described in greater detail herein, the various embodiments of the present invention are directed to a system and/or method for extracting and recycling at least one layer of a multi-layered construction panel. For instance, once the inner layer of the multi-layered construction panel is separated from the outer layers, the inner layer may be processed in the manner described herein and used to create a subsequent or recycled construction panel, or otherwise be used to create the inner layer of a subsequent multi-layered construction panel. As an example, the multi-layered construction panel of at least one embodiment of the present invention may include, but is certainly not limited to, drywall, plasterboard, wallboard, or gypsum board. Accordingly, in at least one embodiment, the multi-layered construction panel includes an inner, gypsum layer wrapped, sandwiched, or otherwise disposed between two outer, paper layers.

Moreover, the machinery or system of at least one embodiment of the present invention comprises an extraction assembly, a crashing assembly, and a milling assembly. Specifically, the extraction assembly will receive the multi-layered construction panel, e.g., via a conveyor belt, conveyor rollers, or other introduction platform.

More in particular, the extraction assembly of the various embodiments of the present invention is structured to separate or extract the inner, gypsum layer from the outer, paper layers by removing or cutting the outer, paper layers there from. Accordingly, the extraction assembly of at least one embodiment comprises a blade assembly which is cooperatively structured and disposed to precisely engage or otherwise contact the outer layers of the multi-layered construction panel and remove or cut away the outer layers thereof. The outer, paper layers are then thrown out or recycled for other use.

The inner, gypsum layer is then fed into a crashing assembly which is structured to break the gypsum layer into a plurality of pieces or portions. For example, the crashing assembly may include a plurality of oppositely disposed crashing rollers which contact the inner gypsum layer as it moves through the crashing assembly. The crashing roller is capable of using force to break up the layer into a plurality of pieces or portions.

The various pieces of broken gypsum are then fed into a milling assembly which is structured to mill or grind the portions into a much smaller or powdery substance. The milling assembly may comprise virtually any milling machine structured to facilitate the practice of the present invention in the intended manner, including, but certainly not limited to, a grinding mill, roller mill, stamp mill, etc.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
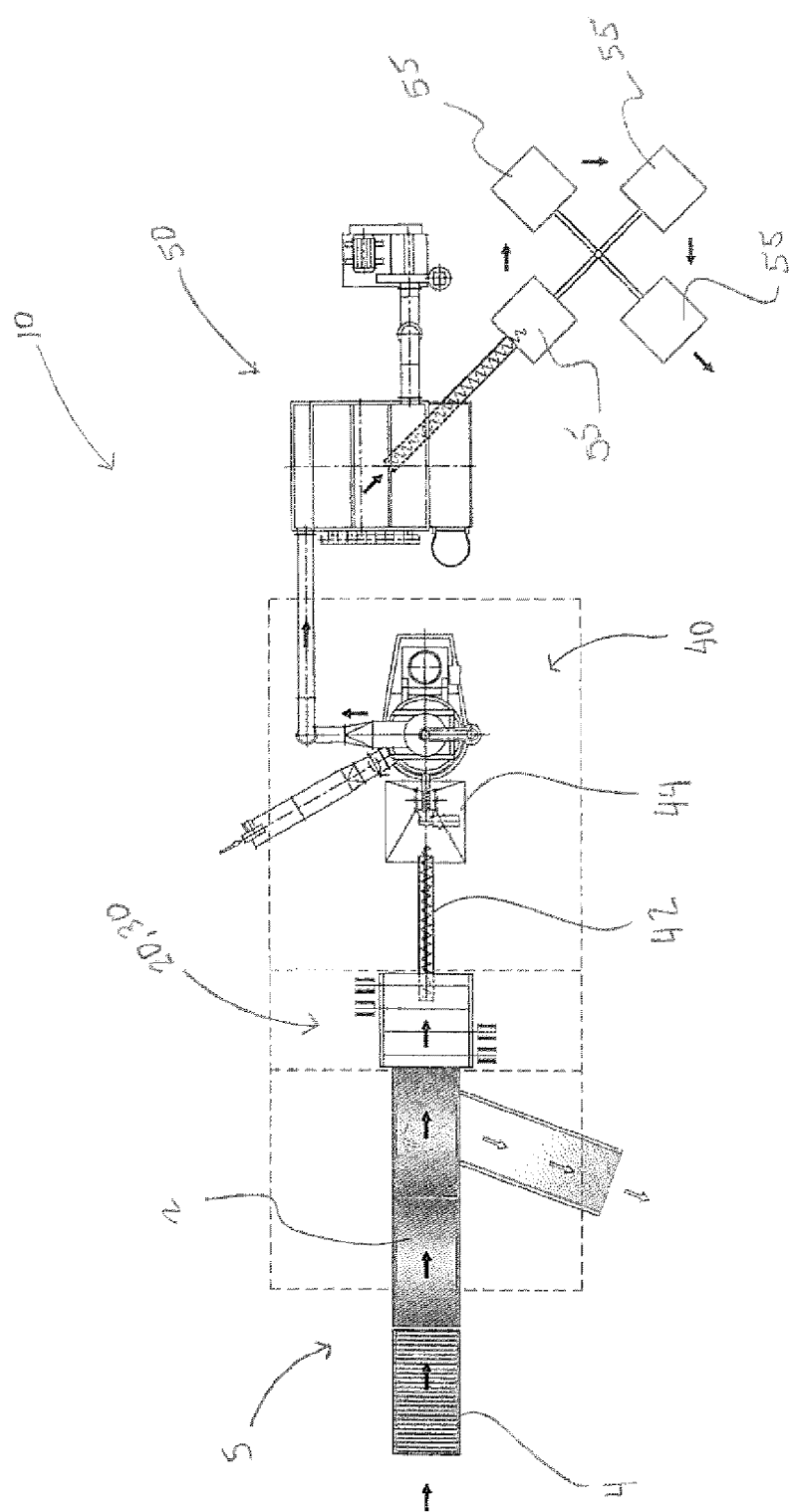
FIG. 1 is a top plan view of the system for extracting and recycling at least one layer of a multi-layered construction panel as described in accordance with one embodiment herein.
Figure 2:
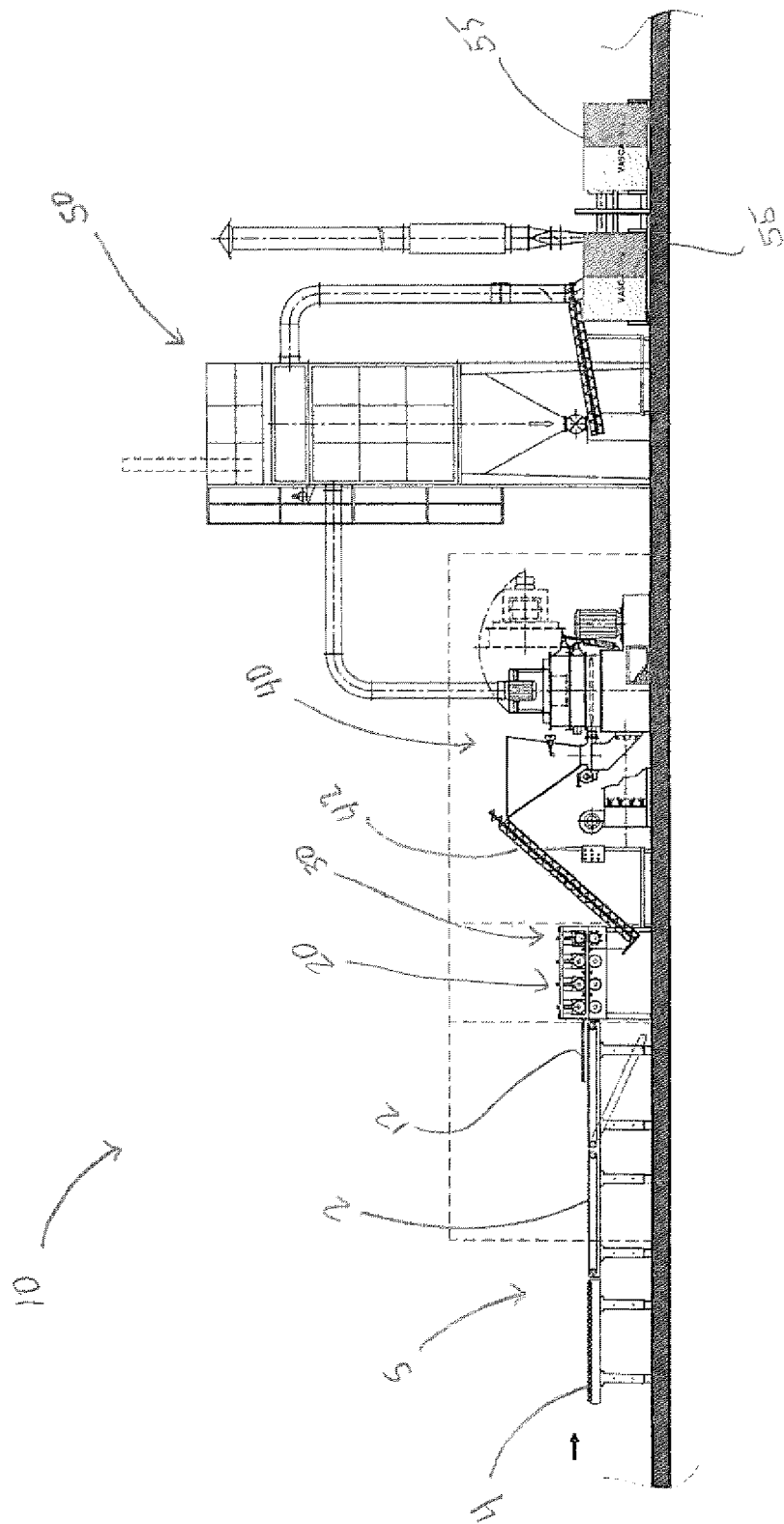
FIG. 2 is a side plan view of the embodiment illustrated in FIG. 1.

The present invention is generally directed to a system 10 and method 100 for extracting and recycling at least one layer of a multi-layered construction panel 12 in a manner in which the material of the extracted layer can be used to create a subsequent multi-layered construction panel, or otherwise be used to create one or more layers of the subsequent panel. In at least one embodiment, the multi-layered construction panel 12 comprises drywall, plasterboard, wallboard, or gypsum board. However, other multi-layered construction panels may be used with the present system 10 and method 100.

In at least one embodiment, the multi-layered construction panel 12, or gypsum board, includes an inner layer 16 wrapped, sandwiched, or otherwise disposed between two outer layers 14,15. The inner layer or inner core 16 may thus, but need not necessarily comprise plaster, gypsum or gypsum plaster. The outer layers 14,15 may, but need not comprise a paper or cardboard liner.

In particular, the machinery or system 10 of at least one embodiment of the present invention comprises an extraction assembly 20, a crashing assembly 30, and a milling assembly 40. Specifically, the extraction assembly 20 is structured to receive the intact multi-layered construction panel 12, preferably on a conveyor belt 2, conveyor rollers 4, or other introduction platform(s) 5. Accordingly, the multi-layered construction panel 12 is disposed onto the introduction platform 5 and introduced or otherwise movably disposed or fed into the extraction assembly 20. In at least one embodiment, the multi-layered construction panels 12 are fed into the extraction assembly 20 one-by-one or in a single layer (e.g., side-by-side or end-to-end manner), such that the outer layers 14,15 of each of the panels 12 are exposed or will be exposed to a cooperatively disposed blade assembly, as will be discussed in more detail below.

Figure 4:
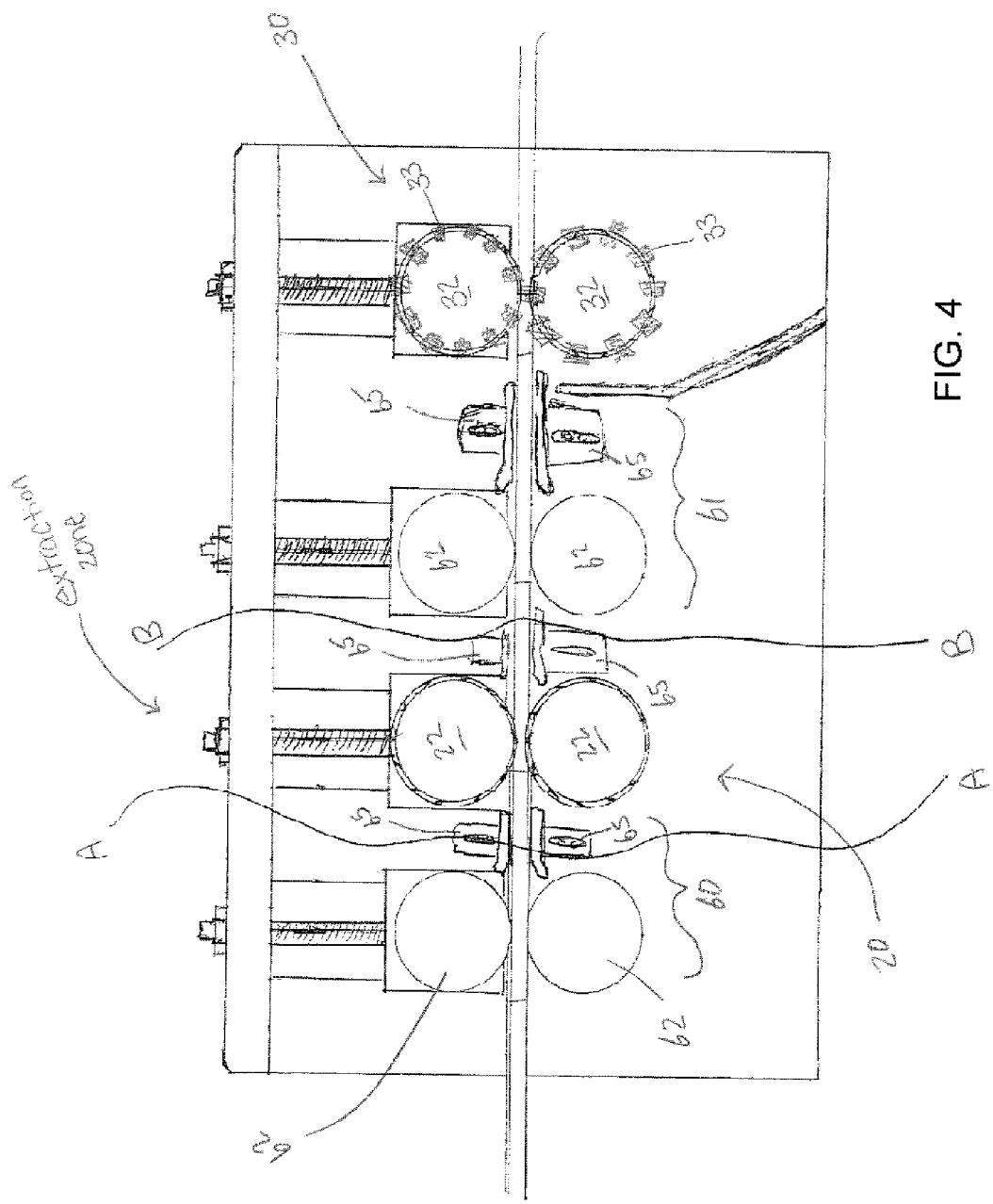
FIG. 4 is a schematic representation of the extraction assembly and crashing assembly as disclosed in accordance with at least one embodiment herein.

Referring now to FIG. 4, at least one embodiment comprises at least one, but preferably a plurality of guiding assemblies 60, 61. The guiding assemblies 60,61 of at least one embodiment each comprise one or more guiding rollers 62 and one or more guide rails 65. For example, introduction guiding assembly 60 is structured to receive the multi-layered construction panel 12 from introduction platform 5 and guide or otherwise facilitate feeding the multi-layered construction panel 12 into the extraction assembly 20. As illustrated in FIG. 4, introduction guiding assembly 60 comprises a plurality of automated or rotating rollers 62 disposed on opposite transverse sides of the multi-layered construction panel 12 as the panel 12 moves there through. The rollers 62 of at least one embodiment may be driven by a driving assembly (not illustrated) which causes the rollers to automatically rotate. Upon rotational contact of the rollers 62 with an incoming panel 12, the panel 12 is fed into the correspondingly disposed guide rails 65. In particular, guide rails 65, of at least one embodiment, comprise spaced apart walls 66 which define a receiving zone dimensioned to receive the multi-layered construction panel therein. Specifically, the guide rails 65 are structured to guide and stabilize the construction panel 12 as is moves through the "extraction zone" of the extraction assembly 20, as illustrated in the exemplary embodiment shown in FIG. 5.

More in particular, the extraction assembly 20 of the various embodiment of the present invention is structured to separate or extract at least one layer, such as, for example, the inner gypsum plaster layer 16, of the multi-layered construction panel 12. Accordingly, the extraction assembly 20, of at least one embodiment comprises a blade assembly 22 which is cooperatively structured and disposed to engage or otherwise contact the multi-layered construction panel 12 and remove or cut away the outer layers 14,15 thereof.

Figure 5:
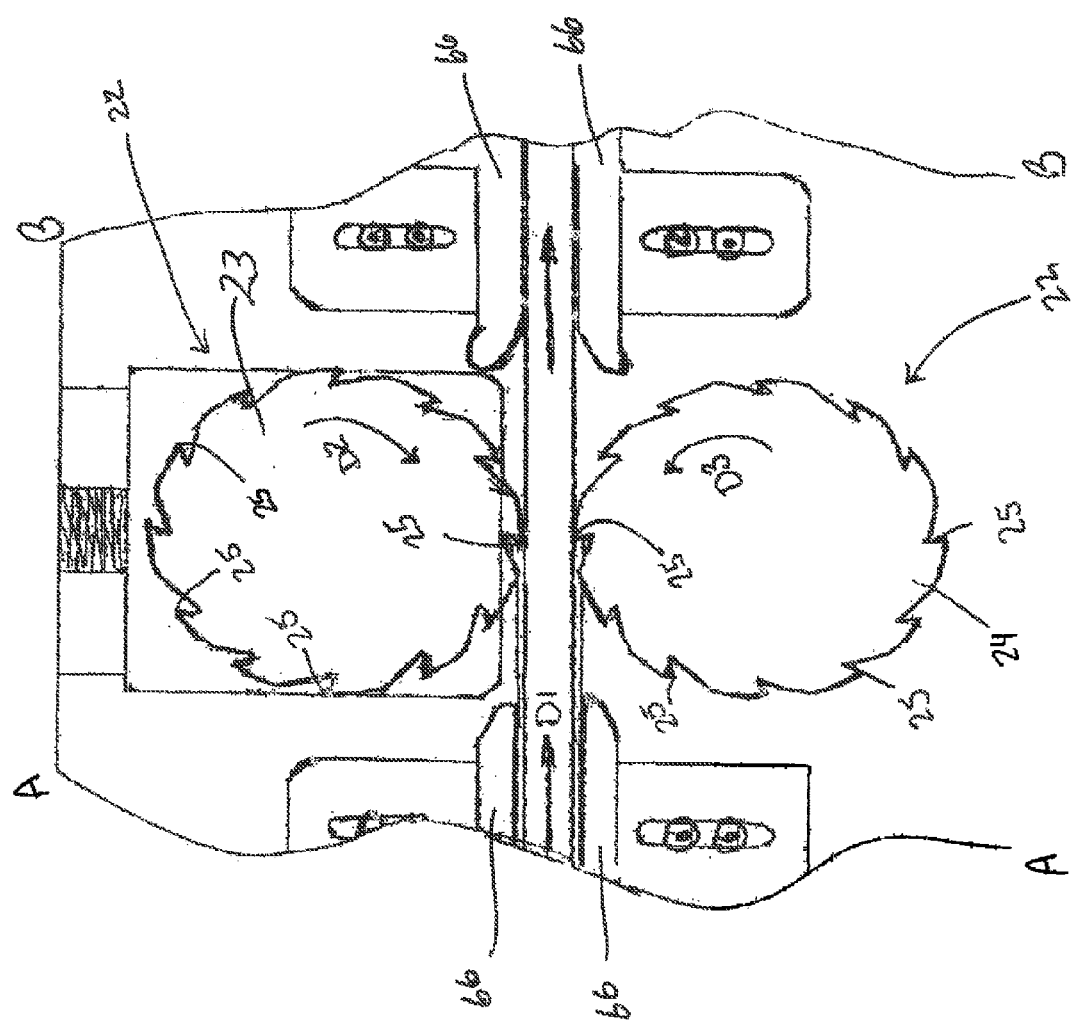
FIG. 5 is a schematic representation of the extraction zone as illustrated in FIG. 4.

For example, as illustrated in FIG. 5, the blade assembly 22 comprises two oppositely disposed blades 23,24 structured to operatively rotate (by virtue of being connected to a driving assembly, not shown) in a direction against the panel's 12 path of travel. For instance, the panel's path of travel is illustrated at reference character D1, whereas the rotational movement of the blades 23,24 are shown at reference characters D2 and D3, respectively.

In at least one embodiment, the blade assembly 22, and in particular, the blades 23,24, comprise a plurality of cutting edges 25 cooperatively positioned in a manner such that when in contact with the multi-layered construction panel 12, the blades 23,24 and the cutting edges scrape or otherwise cut off the outer layers 14,15 only, thereby leaving the inner layer 16. Thus, the cutting edges 25 are precisely and cooperatively positioned relative to the incoming panel 12 in order to cut through and under the outer layers 14,15 so as to completely remove them from the inner layer 16.

As such, the disposition of the blades 23,24 on opposite transverse sides of the moving construction panel 12, as illustrated in FIG. 5, wherein both sides or outer layers 14,15 are simultaneously exposed to a corresponding blade 23,24, serves to simultaneously remove both outer layers 14,15 from the multi-layered construction panel 12 or gypsum board. In such an embodiment, the guiding assemblies 60,61, and in particular the rollers 62 and rails 65, allow for the both upper and under sides of the panel 12 to be exposed to the blades 23,24. Specifically, the "extraction zone" of the extraction assembly 20 of at least one embodiment does not have a conveyor belt or platform in which the panel 12 sits or moves along. Rather, the use of the guiding assemblies 60,61 allow for the outer layers 14,15 of the panel 12 to be simultaneously exposed to oppositely disposed blades 22,23.

Of course, other extraction assemblies are contemplated which may, for example, pass the panel 12 through a first blade or cutting assembly, which removes one outer layer 14, and then subsequently passing the panel 12 through a secondary blade or cutting assembly, which removes the other outer layer 15. Once the outer layers 14,15 are removed by the extraction assembly 20, they may then be discarded, although other uses, including recycling, are certainly contemplated.

Referring again to FIG. 4, as the panel 12 or inner layer 16 passes through the "extraction zone" or blade assembly, it is received by an intermediate guiding assembly 61. Intermediate guiding assembly 61 is structured to guide the extracted or separated inner layer 16 into the crashing assembly 30.

In particular, the crashing assembly 30 is structured to receive the removed inner layer 16 from the extraction assembly 20 and/or intermediate guiding assembly 61 and break the layer 16 into a plurality of pieces or portions. This can be done in any of a number of different ways. One example includes at least one crashing roller 32 which is capable of using force to break up the layer 16 into a plurality of pieces or portions. In particular, the crashing roller(s) 32 may be disposed along the path of travel of the inner layer 16 and comprise a plurality of cooperatively disposed teeth or protrusions 33 which are cooperatively disposed and structured to contact the inner portion 16 as it passed there through. As illustrated in FIG. 4, two oppositely disposed crashing rollers 32 are rotationally disposed (by virtue of being connected to a driving assembly, not shown) in the path of travel of the separated inner layer 16 and comprise a plurality of teeth 33 structured to contact the inner portion 16 and break the inner layer 16 into a plurality of portions upon contact therewith.

Figure 3:
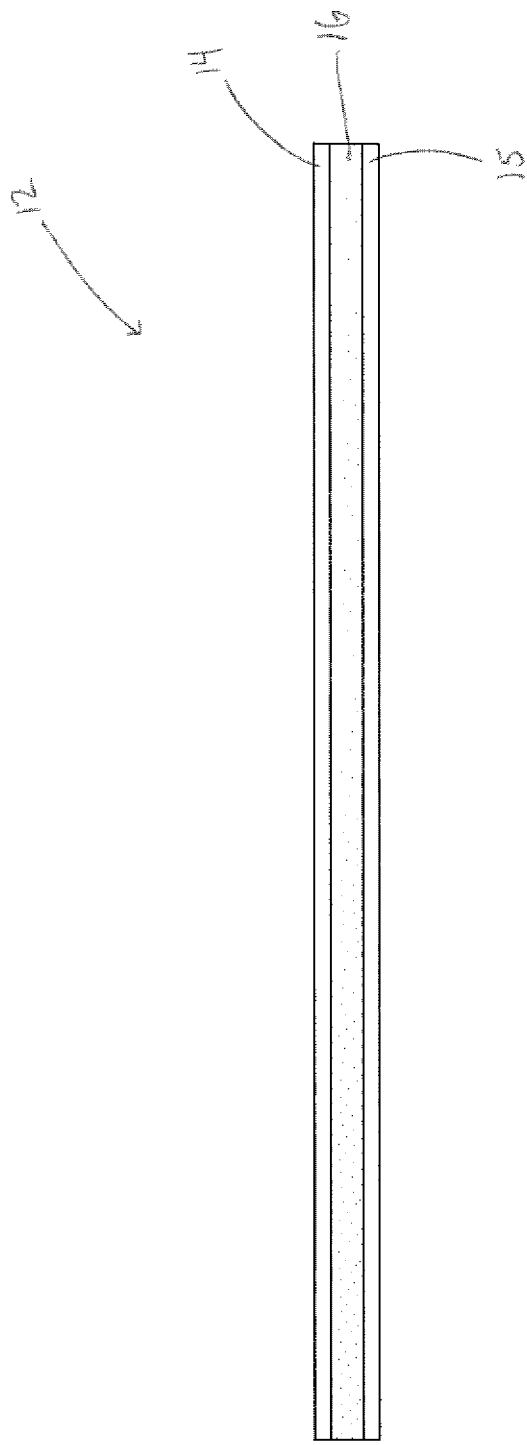
FIG. 3 is a side view of an illustrative multi-layered construction panel.

Of course, the crashing rollers 32 illustrated in FIG. 3 are merely exemplary and other structures or assemblies may be used in order to break the inner layer 16 into a plurality of pieces including, but certainly not limited to, one or more hammers, crushers, or other devices that may move back and forth perpendicularly to the layer 16 and contact the layer 16 with force causing the layer 16 to break up into a plurality of portions.

The present invention further comprises a milling assembly, generally illustrated at 40, which is structured to receive the plurality of portions of the inner, gypsum layer 16 from the crashing assembly 30 and mill the portions into a powdery or other small substance. For instance, referring to FIG. 1, the system 10 of the present invention may comprise a feeding assembly 42 which is structured to transport the plurality of portions from the crashing assembly 30 and into a receiving receptacle 44 of the milling assembly 40. As generally illustrated, the feeding assembly 42 comprises a coil-based transporter using an internal movable coil which is structured to move the plurality of broken portions there though. However, other feeding assemblies 42 are contemplated, including standard conveyor belts, trucks, etc.

The milling assembly 40 comprises a conventional milling machine structured to receive the broken portions and generate a powder or other smaller substance therefrom. The milling assembly 40 may thus comprise any type of milling machine, including, but certainly not limited to a grinding mill, roller mill, stamp mill, etc.

In at least one embodiment, the system 10 further comprises a storage and/or distribution assembly 50 which is structured to receive the powder or final substance from the milling assembly 40 and store or otherwise distribute the substance into one or more containers 55.

The present invention further comprises a method 100 for extracting and recycling at least one layer of a multi-layered construction panel using the various structures and assemblies as described in detail above. For example, and referring to FIG. 6, the method 100 of at least one embodiment comprises separating the inner layer of a multi-layered construction panel, generally represented at 102. This may be done in a number of different ways. For example, in at least one embodiment, the multi-layered construction panel is disposed or introduced into an extraction assembly wherein the outer layers of the multi-layered construction panel are simultaneously removed or cut off via oppositely disposed rotating blade assemblies. The panel maybe guided through the "extraction zone" or blade assemblies by virtue of one or more guiding assemblies, including guiding rollers and guiding rails.

Once the inner layer is extracted or separated from the multi-layered construction panel, the method 100 further comprises crashing or breaking the separated interior layer into a plurality of portions, generally represented at 104. In particular, the separated inner layer is fed into a crashing assembly wherein the inner layer is smashed, crashed, or otherwise broken into a plurality of pieces via one or more crashing rollers, hammers, etc.

Figure 6:
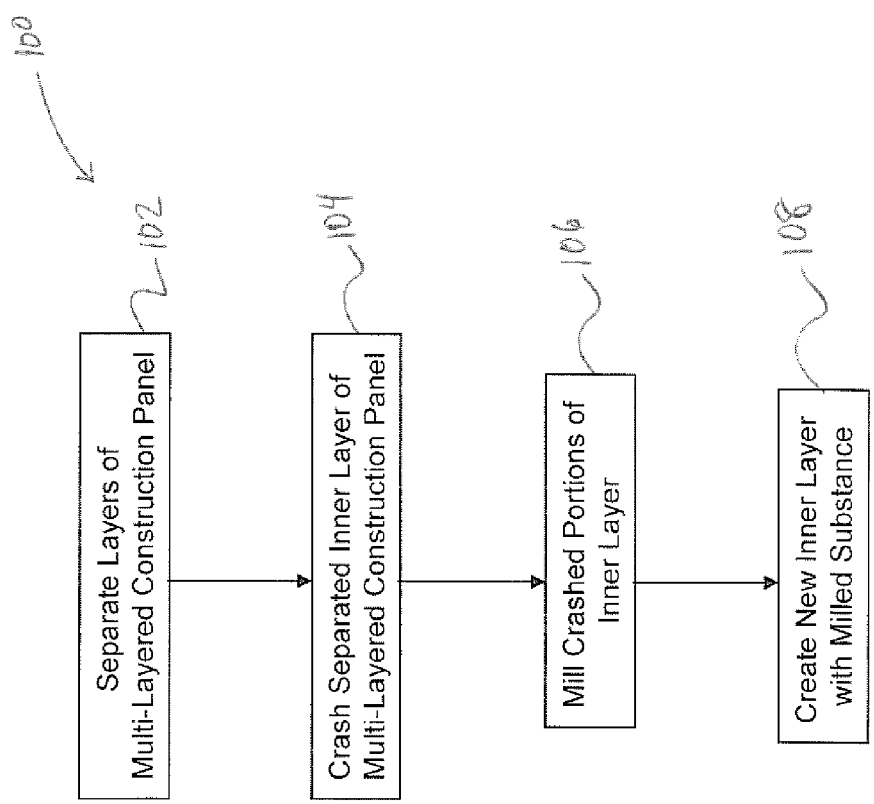
FIG. 6 is a high-level flow chart of the method for extracting and recycling at least one layer of a multi-layered construction panel as disclosed in accordance with at least one embodiment herein.

Still referring to FIG. 6, the method 100 of at least one embodiment of the present invention further comprises milling the plurality of portions into a final substance (e.g., a powder substance), generally referenced as 106. For instance, the plurality of portions of the inner layer are transported or otherwise fed into a milling assembly which is structured to mill or grind the portions into the final substance.

Finally, the substance is then transported into a storage or transportation assembly 50 wherein the substance can be distributed into one or more containers for transportation or storage. Specifically, once the final powder substance is created, it may be used to subsequently manufacture another multi-layered construction panel, and in particular, it can be used to create the inner layer of gypsum bard, as at 108 in FIG. 6. Importantly, the system 10 and method 100 of the present invention preserves the chemical values or additives which were initially added to the raw gypsum to create the initial gypsum board. Accordingly, one need not impart additional additives into the final product of the present invention. Instead, the final product may be immediately used to create additional or recycled gypsum board.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method for extracting at least one layer of a multi-layered construction panel, the method comprising:
    separating an interior layer of the multi-layered construction panel by removing outer top and bottom layers of the multi-layered construction panel,
    breaking the interior layer into a plurality of portions, and milling the plurality of portions into a powder substance via disposition of the plurality of portions into a milling assembly, wherein the powder substance can be used to create a recycled interior layer of another multi-layered construction panel.

2. The method as recited in claim 1 further comprising introducing the multi-layered construction panel into an extraction assembly§ wherein the interior layer is separated by removing the outer top and bottom layers.

3. The method as recited in claim 2 further comprising transporting the multi-layered construction panel though a series of blades wherein the series of blades are movably disposed in a direction opposite of the multi-layered construction panel's path of travel.

4. The method as recited in claim 3 further comprising defining the series of blades as comprising rotating blades disposed on opposing sides of the multi-layered construction panel, the rotating blades being structured to remove the outer top and bottom layers as the multi-layered construction panel passed thereby.

5. The method as recited in claim 4 further comprising introducing the separated interior layer into a crashing assembly, wherein the interior layer is broken into the plurality of portions.

6. The method as recited in claim 5 further comprising introducing the plurality of broken portions into the milling assembly, wherein the plurality of portions are ground into the powder substance.

7. The method as recited in claim 6 further comprising disposing the powder substance into a storage container.

8. A method for extracting at least one layer of a multi-layered construction panel, the method comprising:
    separating an interior layer of the multi-layered construction panel by removing outer top and bottom layers of the multi-layered construction panel,
    introducing the multi-layered construction panel into an extraction assembly via a movable platform, the extraction assembly comprising at least one blade assembly movable in a direction opposite of the movable platform, removing an outer layer of the multi-layered construction panel via the at least one blade assembly during travel of the multi-layered construction panel through the extraction assembly on the movable platform and thereby separating at least one layer from the multi-layered construction panel, introducing the at least one separated layer into a crashing assembly, wherein the at least one separated layer is broken into the plurality of portions, and introducing the plurality of broken portions into a milling assembly, wherein the plurality of portions are ground into a powder substance, the powder substance being structured to use to create a recycled interior layer of another multi-layered construction panel.

9. A system for extracting at least one layer of a multi-layered construction panel, said system comprising:

an introduction platform structured to receive the multi-layered construction panel thereon and movably disposed the multi-layered construction panel into an extraction assembly, said extraction assembly comprising at least one rotating blade assembly disposable in a cutting relation with the multi-layered construction panel as the multi-layered construction panel is movably disposed there through, said rotating blade assembly comprising at least one blade rotationally disposed in an opposite direction relative to the multi-layered construction panel's path of travel, said rotating blade assembly being structured to remove at least one outer layer of the multi-layered construction panel thereby exposing an inner layer thereof, a crashing assembly structured to receive the inner layer of the multi-layered construction panel from said extraction assembly, said crashing assembly being structured to break the inner layer of the multi-layered construction panel into a plurality of portions, and a milling assembly structured to receive the plurality of portions from said crashing assembly and generate a powder substance there from, wherein said powder substance is structured for use in creating a recycled interior layer of another multi-layered construction panel.

10. The system as recited in claim 9 wherein said rotating blade assembly comprises a plurality of at least two blades cooperatively positioned on opposite sides of the path of travel of the multi-layered construction panel.

11. The system as recited in claim 10 wherein each of said plurality of at least two blades are cooperatively positioned to remove a different one of a plurality of two outer layers of the multi-layered construction panel.

12. The system as recited in claim 10 wherein each of said plurality of at least two blades are cooperatively positioned to simultaneously remove a different one of a plurality of two outer layers of the multi-layered construction panel.

13. The system as recited in claim 10 further comprising an introduction guiding assembly disposed between said introduction platform and said extraction assembly.

14. The system as recited in claim 13 wherein said introduction guiding assembly comprises a plurality of guiding rollers and at least one guide rail, said introduction guiding assembly being structured to receive the multi-layered construction panel from said introduction platform and feed the multi-layered construction panel into said extraction assembly.

15. The system as recited in claim 14 further comprising an intermediate guiding assembly disposed between said extraction assembly and said crashing assembly.

16. The system as recited in claim 15 wherein said intermediate guiding assembly comprises a plurality of guiding rollers and at least one guide rail, said intermediate guiding assembly being structured to receive the extracted inner layer of the multi-layered construction panel from said extraction assembly and feed the inner layer into said crashing assembly.

17. The system as recited in claim 9 wherein the multi-layered construction panel comprises a gypsum board.

18. The system as recited in claim 10 wherein the inner layer of the multi-layered construction panel comprises gypsum.

\* \* \* \* \*